No. 747,581. PATENTED DEC. 22, 1903.
C. F. BOULE.
KITCHEN CABINET.
APPLICATION FILED MAY 17, 1902.
NO MODEL. 2 SHEETS—SHEET 1.

Witnesses
Inventor
Charles F. Boule.
By
Attorneys

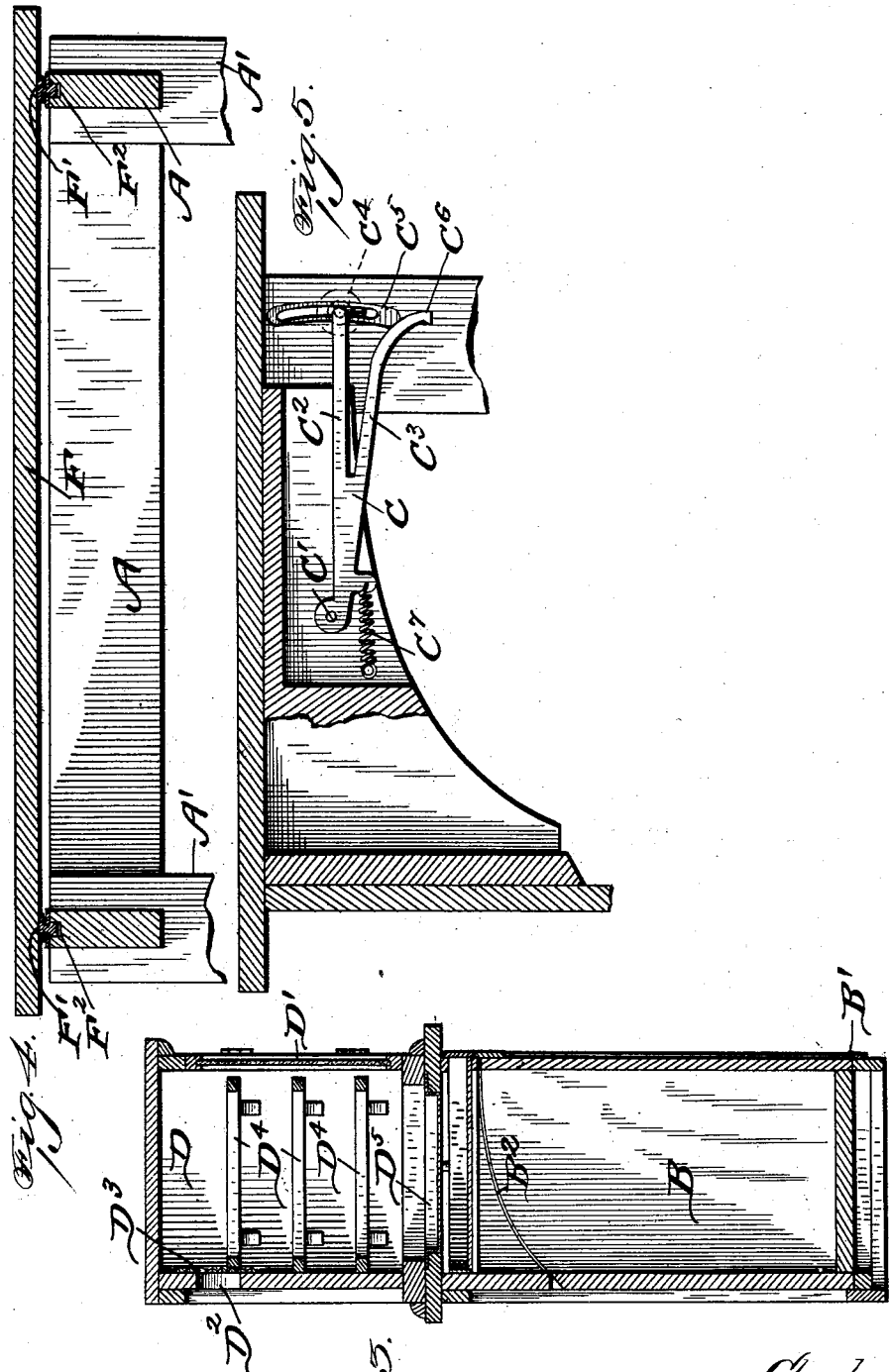

No. 747,581.

Patented December 22, 1903.

UNITED STATES PATENT OFFICE.

CHARLES FRANKLIN BOULE, OF CHICAGO, ILLINOIS.

KITCHEN-CABINET.

SPECIFICATION forming part of Letters Patent No. 747,581, dated December 22, 1903.

Application filed May 17, 1902. Serial No. 107,764. (No model.)

*To all whom it may concern:*

Be it known that I, CHARLES FRANKLIN BOULE, a citizen of the United States, residing at Chicago, in the county of Cook and State of Illinois, have invented a new and useful Kitchen-Cabinet, of which the following is a specification.

This invention is a kitchen-cabinet, the object being to provide a device particularly adapted for use in bread-making.

With this object in view the invention consists in the novel features of construction, combination, and arrangement, all of which will be fully described hereinafter and pointed out in the claims.

Figure 1:
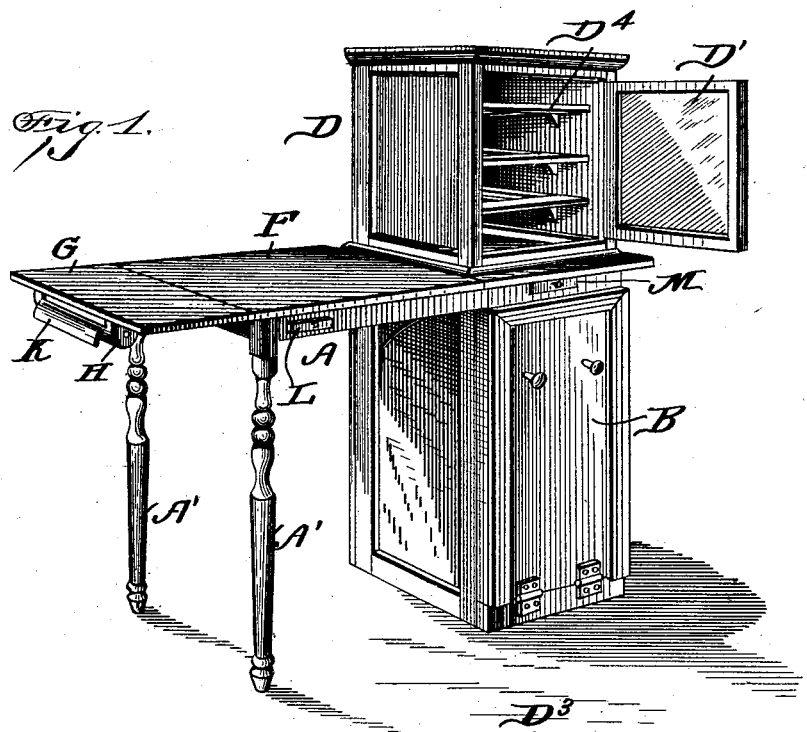
Figure 2:
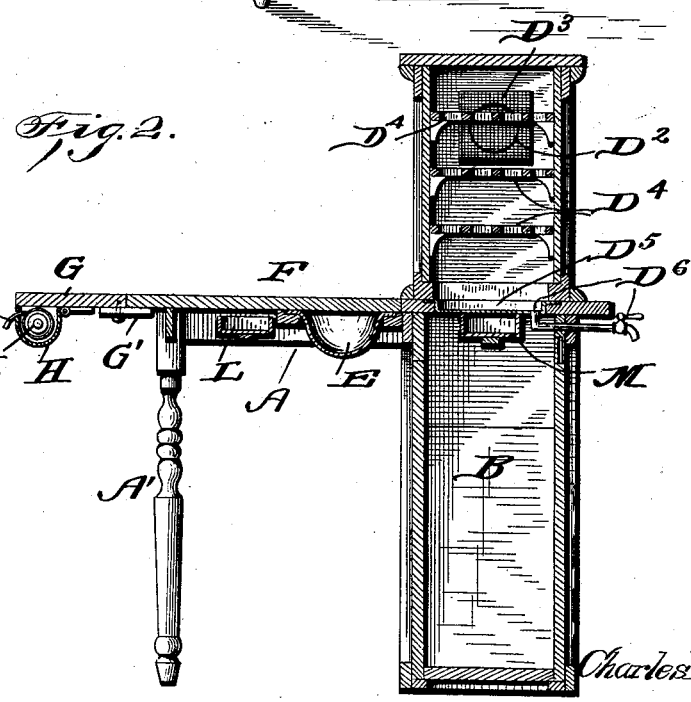

In the drawings forming part of this specification, Figure 1 is a perspective view of a kitchen-table with my cabinet attached constructed in accordance with my invention. Fig. 2 is a vertical longitudinal sectional view thereof. Fig. 3 is a transverse section. Fig. 4 is a transverse section taken through the top of the table. Fig. 5 is a detail sectional view illustrating the mechanism for securing the flour-bin against movement in either direction.

In carrying out my invention I employ a table-frame A, supported at one end by legs A', the opposite end being supported by the casing, within which is arranged the flour-bin B, said bin being hinged at B' and adapted to swing outwardly. The upper end of said bin is curved, as shown at B², and in order to prevent the bin swinging inwardly or outwardly I employ a spring-actuated latch C, pivoted at C' and having two members C² and C³, the member C² having a knob C⁴ arranged upon the exterior of the case and working in a slot C⁵. The member C³ has a depending nose C⁶, which is adapted to engage the curved edge B² of the bin and hold the said bin locked either in an open or closed position, a coil-spring C⁷ normally throwing the said latch downwardly, as indicated in Fig. 5, and whenever it is desired to open or close the bin it is necessary to raise the latch by pushing the knob upwardly. Directly above the flour-bin is arranged a cupboard or safe D, having a door D' arranged at the front side thereof and an opening D² at the rear protected by means of a wire screen D³. A series of shelves D⁴ are arranged within the cupboard or safe, and a metallic pan D⁵ is arranged in the bottom thereof, said pan having a faucet D⁶, by means of which water may be drawn off from the pan when desired. A bowl E is arranged in the table-frame, said bowl being arranged for the purpose of mixing the dough for the purpose of making bread.

F indicates a sliding table-top having T-shaped rods F' secured to the under side thereof and which work in guides F², secured to the longitudinal members of the table-frame. This table-top F slides over the bowl E and forms a tight cover for the same. The table-top F is formed with a hinged extension G, which can be turned up and secured in a horizontal position by means of the cleat G', and the tubular case H is hinged to the under side of the extension G, said case having a spring-roller I journaled therein and to which a cloth or towel K is attached, said roller being constructed and arranged substantially after the fashion of the ordinary curtain-roller.

L and M indicate drawers of ordinary construction, the drawer L being arranged to slide in the table-frame A and preferably constructed to hold spices, while the drawer M is adapted to slide between the door of the flour-bin and the bottom of the cupboard or provision-safe.

While my invention is particularly adapted for use in making and raising bread, it will of course be understood that it can be used generally for all kitchen purposes. The flour is preferably contained within the bin B, and whenever it is desired to make bread the table-top is slid back, exposing the bowl, and the flour and other ingredients are mixed in the said bowl. After the said ingredients have been mixed and it is desired to work the dough, the top of the table is slid back and the cloth or towel pulled out and spread over the table-top, as it is much easier to work the dough upon a cloth than upon a board surface. After the dough has been thoroughly mixed, it is again placed in the bowl and the table-top slid over the said bowl, excluding the air and permitting the bread to receive its first rising. At the proper time the table-top is slid back, the dough reworked, and then placed in the cupboard or provision-safe to receive the second rising, or, as it is sometimes called, "proofing," and in order to facilitate this operation a small quantity of warm water is placed in the pan in the bottom of the cupboard.

It will thus be seen that all of the parts of my invention are especially constructed and arranged to facilitate the making of bread. The cupboard or provision-safe, however, is also especially adapted for keeping bread, cake, and similar materials moist, as by placing a small quantity of water in the pan in the bottom thereof all articles stored therein will be kept in a moist condition and prevented from becoming dry and crisp. By having a latch for locking the bin all danger of the bin closing upon a person while taking flour therefrom is avoided.

Having thus fully described my invention, what I claim as new, and desire to secure by Letters Patent, is—

1. A device of the kind described, comprising a casing, an outwardly-swinging bin arranged therein, the sides of said bin having rearwardly-curved edges, a latch pivoted within the casing adjacent one of said edges, said casing having a curved slot and said latch comprising two members, one of which is adapted to bear on the curved edge of the bin, a knob on the other member, said knob working in the slot, and a spring adapted to normally hold one of the latch members in engagement with the bin.

2. A bread-making device comprising a casing, a flour-bin arranged therein and adapted to swing outward, means for locking the bin in closed or open position, a table supported at one end by said casing, a sliding top on said table, a bowl arranged below and covered by said sliding top, and a cloth connected to the end of the table opposite the casing and adapted to be folded back over same.

CHARLES FRANKLIN BOULE.

Witnesses:
EDWIN H. GILL,
EDWARD MAYETTE.